United States Patent
Marquezan et al.

(10) Patent No.: US 8,745,211 B2
(45) Date of Patent: Jun. 3, 2014

(54) METHOD FOR OPERATING AT LEAST ONE VIRTUAL NETWORK ON A SUBSTRATE NETWORK AND A VIRTUAL NETWORK ENVIRONMENT

(75) Inventors: Clarissa Marquezan, Porto Alegre (BR); Giorgio Nunzi, Heidelberg (DE); Marcus Brunner, Leimen (DE)

(73) Assignee: NEC Europe Ltd., Heidelberg (DE)

( * ) Notice: Subject to any disclaimer, the term of this patent is extended or adjusted under 35 U.S.C. 154(b) by 385 days.

(21) Appl. No.: 13/133,951

(22) PCT Filed: Dec. 10, 2009

(86) PCT No.: PCT/EP2009/008837
§ 371 (c)(1),
(2), (4) Date: Jun. 10, 2011

(87) PCT Pub. No.: WO2010/066430
PCT Pub. Date: Jun. 17, 2010

(65) Prior Publication Data
US 2011/0246647 A1    Oct. 6, 2011

(30) Foreign Application Priority Data
Dec. 10, 2008   (EP) ................................... 08021429

(51) Int. Cl.
*G06F 15/173*   (2006.01)
*G06F 15/177*   (2006.01)
*G06F 15/16*   (2006.01)

(52) U.S. Cl.
USPC .......................... 709/224; 709/220; 709/235

(58) Field of Classification Search
None
See application file for complete search history.

(56) References Cited

U.S. PATENT DOCUMENTS

| 5,764,740 A | 6/1998 | Holender |
| 7,730,183 B2 * | 6/2010 | Brown et al. ................. 709/226 |
| 2008/0095176 A1 | 4/2008 | Ong et al. |

(Continued)

FOREIGN PATENT DOCUMENTS

| JP | 2007074055 A | 3/2007 |
| JP | 2008042665 A | 2/2008 |

OTHER PUBLICATIONS

International Search Report, dated May 21, 2010, from corresponding PCT application.
Yong Zhu et al., "Algorithms for Assigning Substrate Network Resources to Virtual Network Components", 25th IEEE International Conference on Computer Communications Proceedings, Apr. 1, 2006, pp. 1-12.

(Continued)

*Primary Examiner* — John B. Walsh
(74) *Attorney, Agent, or Firm* — Young & Thompson

(57) ABSTRACT

For allowing an efficient consumption of resources of a physical substrate network a method for operating at least one virtual network on a substrate network is claimed, especially within a framework of a self-organizing model for optimizing resource consumption of the substrate network, wherein the virtual networks are including a plurality of virtual nodes each being assigned to respective substrate nodes of the substrate network and wherein two adjacent virtual nodes of the same virtual network are connected by a virtual link which is corresponding to one or more respective substrate node links, including the following steps: Identifying a traffic pattern within at least two substrate nodes with regard to the resources individually consumed by the virtual networks; reallocating of the resources depending on an evaluation of the identified traffic patterns for optimizing resource consumption within the substrate nodes, wherein the identifying step and the evaluation and decision to execute the reallocation of resources is performed locally at each individual substrate node. Further, an according virtual network environment on a substrate network is claimed, preferably for carrying out the above mentioned method.

22 Claims, 14 Drawing Sheets

(56) References Cited

U.S. PATENT DOCUMENTS

2009/0097406 A1* 4/2009 Nilakantan et al. ........... 370/235
2009/0300605 A1* 12/2009 Edwards et al. ................. 718/1
2011/0231564 A1* 9/2011 Korsunsky et al. ........... 709/231

OTHER PUBLICATIONS

Japanese Office Action, dated Mar. 12, 2013, from corresponding JP application.

* cited by examiner

METHOD FOR OPERATING AT LEAST ONE VIRTUAL NETWORK ON A SUBSTRATE NETWORK AND A VIRTUAL NETWORK ENVIRONMENT

BACKGROUND OF THE INVENTION

1. Field of the Invention

The present invention relates to a method for operating at least one virtual network on a substrate network, especially within a framework of a self-organizing model for optimizing resource consumption of the substrate network, wherein the virtual networks are comprising a plurality of virtual nodes each being assigned to respective substrate nodes of the substrate network and wherein two adjacent virtual nodes of the same virtual network are connected by a virtual link which is corresponding to one or more respective substrate node links. Further, the present invention relates to a virtual network environment on a substrate network, especially within a framework of a self-organizing model for optimizing resource consumption of the substrate network, wherein the virtual networks are comprising a plurality of virtual nodes each being assigned to respective substrate nodes of the substrate network and wherein two adjacent virtual nodes of the same virtual network are connected by a virtual link which is corresponding to one or more respective substrate node links.

2. Description of the Related Art

Network Virtualization is meant to be able to run several service-specific applications on the same networking infrastructure. Also it is useful for the separation between different users, services, and ISPs (Internet Service Provider). Finally, virtualization in the IT world has been successful mainly because of the freedom for data center operator to move the virtual machines based on business and resource usage objective.

In network virtualization we also see a major benefit of moving virtual network nodes fairly free from one physical to another physical node achieving better balance resource usage pattern (traffic engineering in virtual networks), enables non interrupted shutdowns for physical resources for maintenance, and enables reliability through duplicating traffic (work only for certain services running within the virtual network).

The operation of moving a virtual IP router or node from one physical node or substrate node to another has been proposed and shown by Yi Wang, E. Keller, B. Biskern, J. Van der Merwe, J. Rexford, "Virtual Routers on the Move: Live Router Migration as a Network Management Primitive."

The increasing demand of multimedia services over the Internet is pushing for new methods to allocate resources in future networks. For example, IPTV services are expected to become more and more popular and integrated offers, like the triple-pay packages, require cost-effective strategies for resource allocation. In fact, a typical IPTV network infrastructure requires significant investments for the distribution network, in terms of guaranteed bandwidth as well as available storage capacity. Normally, these resources need to be planned and well dimensioned in advance, before upper services can be actually deployed. This is obtainable from N. Degrande, K. Laevens, D. D. Vleeschauwer, and R. Sharpe, "Increasing the User Perceived Quality for IPTV Services", IEEE Communication Magazine, vol 46, no. 2, pp. 94-99, 2008.

The costs of deploying a physical infrastructure may prevent many service providers to get into the market, like in the case of IPTV services. For reference, see S. Han, S. Lisle, and G. Nehib, "IPTV Transport Architecture Alternatives and Economics Considerations", IEEE Communication Magazine, vol 46, no. 2, pp. 70-77, 2008. Nevertheless, recent works in the field of virtual networks offer a viable alternative that promises to cut costs by sharing the infrastructure among different service providers. For reference, see N. Niebert, I. E. Khayat, S. Baucke, R. Keller, R. Rembarz, and J. Sachs, "Network Virtualization: A Viable Path Towards the Future Internet", Journal Wireless Personal Communications, vol 45, no. 4, pp. 511-520, June 2008. The key on network virtualization is of dividing the physical network infrastructure into several slices and associating them to different virtual providers.

The deployment of virtual networks must observe two different perspectives. The former is the perspective of a virtual provider, who wants the accomplishment of the contracted resources—SLAs (Service Level Agreement) must be maintained—while the later regards to the physical infrastructure provider, who wants to save as much as possible its physical resources in order to maximize revenues.

Being this, efficient algorithms to allocate physical resources (links, CPU, and storage capacity) must be put in place by physical providers; otherwise punctual high loads on multiplexed physical resources may create resource scarcity that can prevent the deployment of new virtual networks. Traditionally, physical resources are allocated in the initial planning phase: a planning tool—see D. Agrawal, M. S. Beigi, C. Bisdikian, and N. Lee, "Planning and Managing the IPTV Service Deployment", in Proceedings of 10th IFIP/IEEE International Symposium on Integrated Network Management (IM2007), 2007, pp. 353-362—provides the estimated dimensioning of network components given a certain SLA and resources are allocated based on this output. This approach can be applied for small virtual environments, but in large scale deployments a static allocation cannot take in account the mass imbalance of users' requests between different locations.

SUMMARY OF THE INVENTION

It is an object of the present invention to improve and further develop a method for operating at least one virtual network on a substrate network and an according virtual network environment for allowing an efficient consumption of resources of the physical substrate network.

In accordance with the invention, the aforementioned object is accomplished by a method and a virtual network environment. According to the present invention the method comprises the following steps: Identifying a traffic pattern within at least two substrate nodes with regard to the resources individually consumed by the virtual networks; reallocating of the resources depending on an evaluation of the identified traffic patterns for optimizing resource consumption within the substrate nodes, wherein the identifying step and the evaluation and decision to execute the reallocation of resources is performed locally at each individual substrate node.

According to the present invention the virtual network environment is comprising means for identifying a traffic pattern within at least two substrate nodes with regard to the resources individually consumed by the virtual networks; means for reallocating of the resources depending on an evaluation of the identified traffic patterns for optimizing resource consumption within the substrate nodes, wherein the identifying step and the evaluation and decision to execute the reallocation of resources is performed locally at each individual substrate node.

According to the invention it has been recognized that it is possible to allow an efficient consumption of resources of the physical substrate network by a suitable identification of a traffic pattern within at least two substrate nodes with regard to the resources individually consumed by the virtual networks and by reallocating of the resources depending on an evaluation of the identified traffic patterns for optimizing resource consumption within the substrate nodes. According to the inventive method the identifying step and the evaluation and decision to execute the reallocation of resources is performed locally at each individual substrate node. The inventive method is completely independent from the applications running within the virtual nodes. According to this invention a new approach to manage the resource consumption of already deployed virtual networks is provided. With this approach, resources can be dynamically moved within the virtual layer to maximize over time the consumption of physical resources. The analysis of the conditions responsible for triggering the resource reallocation uses only local information of the physical or substrate node where the analysis is executed. The adoption of a fully decentralized execution supported by localized information allows each entity belonging to management model to make online and autonomous decisions, and the conjunct execution of these entities can produce a self-organizing substrate network.

Preferably, the identifying step and the evaluation and decision to execute the reallocation of resources could be performed by an autonomous entity such as a virtual manager. Such an autonomous entity could provide a very effective management of the discussed functions. This entity could work only on the basis of information monitored on its substrate node.

Within a preferred embodiment of the invention the autonomous entity could be provided on or within a substrate node or external to the substrate node, preferably within a centralized or decentralized management system. Especially in the case of provision of the entity on or within a substrate node a very effective data processing could be realized.

For providing a quick amendment of uneffective network constellations the identifying step could be started when a substrate node link is identified as being overloaded. In this case the above mentioned entity or the virtual manager could trigger the process to identify the traffic pattern of each virtual network using the resources of this substrate node.

With regard to the provision of a self-organizing method there could be provided a monitoring loop for monitoring of resource information which is including the amount of network traffic and reads/writes of each virtual node deployed on the substrate node. Such a monitoring loop could identify an overloaded substrate node link very fast after the occurring of an overload situation.

The network traffic of a substrate node could comprise the network traffic of each virtual node deployed on the substrate node and a cut-through traffic between virtual nodes which are not assigned to said substrate node. Such a cut-through traffic is using the network resources of the substrate node, but no virtual node is associated to the consumed resources. The reduction of cut-through traffic inside the substrate network is an important goal of a self-organizing model.

Preferably, the above mentioned monitoring loop could be performed by the autonomous entity or virtual manager. This could result in a very effective response behavior with regard to overload situations.

Within a preferred embodiment of the invention the decision to execute the reallocation could depend on the presence of cut-through traffic. Avoiding such cut-through traffic is a very effective measure for efficient consumption of resources of the substrate network.

Within a concrete embodiment of the invention the reallocating step could comprise a moving of at least one virtual node from one substrate node to another substrate node. By such a movement especially cut-through traffic could be reduced.

For realizing a particular simple embodiment of the invention the identifying step could be accomplished by heuristics defined to search for a traffic pattern associated with cut-through traffic. Using heuristics the traffic pattern could be identified and the moving mechanism could be activated. Such heuristics could be part of an optimizing framework with regard to efficient resource consumption on the basis of a local view in gathering and evaluation of information within a substrate node. A traffic pattern associated with cut-through traffic could be designated as forward traffic.

Very effective heuristics could comprise a receiving candidate heuristic and a moving candidate heuristic resulting in lists of receiving and moving candidates, respectively. A receiving candidate could be a substrate node which is qualified as being suited for receiving a virtual node of a respective virtual network. A moving candidate could be a virtual node which is qualified as being suited for being moved from its actual substrate node to another substrate node.

For providing a suitable reallocation of the resources the virtual link or links which is or are consuming the resources could be identified after having identified an overloaded substrate link. Thus, it will be possible to identify the virtual networks which are consuming the major amount of resources.

After the identification of the overloaded virtual link or links inside a substrate link it is preferred to determine whether the flow or flows inside the virtual link or links matches or match with the forward traffic pattern of cut-through traffic.

Within a very simple embodiment of the invention the identification of a forward traffic pattern could comprise the comparison of the incoming traffic against the outgoing traffic of the analyzed virtual link, or vice-verse.

Especially with regard to a moving candidate heuristic it should be determined whether the outgoing traffic is generated by a virtual node of the substrate node. In this case not only the comparison of incoming and outgoing traffic of a virtual link is important.

Further with regard to a moving candidate heuristic it should be identified a relationship between the outgoing traffic of the virtual link with the amount of reads and/or writes of the virtual node from or to one or more storage devices within the substrate node.

In a preferred embodiment the method could be realized within a self-organizing model or self-organizing control loop for optimizing resource consumption of the substrate network.

A preferred and effective self-organizing model or control loop could comprise at least five stages which are including:
1. At least two and preferably each substrate node makes a local analysis of potential candidates to migrate.
2. Substrate node sends information about the virtual node or nodes that it wants to receive.
3. Local matching and/or negotiating of moving necessities, wherein preferably the substrate node or substrate node owner of the virtual node to be moved decides which substrate neighbour will receive the virtual node.
4. Announcement of the match between request to move and virtual node to be moved 5. Virtual node migration mechanism.

Within the above first stage each physical or substrate node could make a local analysis of potential traffic candidates to migrate. Such an analysis can be performed in an asynchronous way. Within the second stage physical neighbors could exchange information about the virtual nodes that they want to receive. The third stage can be designated as evaluation stage with the result of a decision of movement. Within the fourth stage an announcement of the decision and if necessary confirmation of the request for the resources can be performed. The virtual node migration within the fifth stage could comprise the migration of storage and the application (APP).

Within a preferred embodiment the self-organizing model or control loop could further comprise as the sixth stage a local evaluation of the migration or moving mechanism. Further, the decision to execute reallocation of resources and/or the evaluation of the migration or moving mechanism could preferably comprise the consideration of a history of self-organization processes of the respective substrate node and/or virtual node or network. In this case a multiple moving back and forth could be avoided.

The present invention could provide an important contribution to development of Future Internet wherein it is preferred that the networks should function automatically without human intervention. A self-* functionality to the network virtualization area is preferred.

The monitoring of the infrastructure network and the decision for initiating a move of a virtual node are considered in the present invention. Specifically, the present invention performs without any knowledge about the functionality running within a virtual node, but bases the decision on transparent monitoring of the resource usage of the node and decentralized interaction with neighboring nodes.

On the basis of the present invention a monitoring of packets arriving and leaving from a virtual node per physical interface is possible. Within a preferred application of the invention cut-through traffic of a virtual network is considered. This is traffic flowing through the router or node, which belongs to a certain virtual network, but it does not have a virtual node present on that router or substrate node.

The decision for movement of a virtual node to a neighboring substrate node is purely based on the local monitored resource usage patterns of virtuals nodes belonging to a virtual network and is therefore independent from the functionality running within the virtual node (transparency).

The present invention is providing the basis of self-optimizing virtual networks. A higher throughput and optimized traffic load on the real substrate network can be achieved. The movement of virtual nodes out of a substrate node is possible in case this one is shut down for maintenance or for reduced energy consumption of the overall network. The present invention can be realized independent of the network functionality running within the virtual networks since the solution is based on the observation of the resources' consumption of a virtual node, i.e. incoming and outgoing packets and reads and writes from storage devices.

On the basis of the present invention a real-time reallocation of virtual network resources operating on a physical infrastructure is possible. Such a reallocation is completely independent to the applications running within the virtual nodes.

The present invention is providing a new approach to manage the resource consumption of already deployed virtual networks. With this approach, resources can be dynamically moved within the virtual layer to maximize over time the consumption of physical resources. Such a self-organizing model is based on local information of resource consumption to implement a real-time reallocation scheme for virtual networks.

The present invention is providing heuristics to detect which virtual network traffic is overloading a certain substrate node. There are established evaluation criteria based on local knowledge to determine whether reallocating of resources is required. The characterization of a traffic pattern is based on a local view. The execution of the evaluation and decision to execute the reallocation of resources is completely distributed within the network. No central entity is used.

It is defined a self-organizing management model responsible for reallocating virtual resources. The goal of the self-organizing model is to reduce the overall traffic of the substrate network by the redefinition of virtual links and the migration of virtual nodes (hosting applications) to physical locations near to the user's request. The algorithms behind the self-organizing model are executed by each physical node of the infrastructure network, dismissing, in this way, a central entity.

BRIEF DESCRIPTION OF THE DRAWING FIGURES

There are several ways how to design and further develop the teaching of the present invention in an advantageous way. To this end, it is to be referred to the following explanation of preferred examples of embodiments of the invention illustrated by the drawing on the other hand. In connection with the explanation of the preferred examples of embodiments of the invention by the aid of the drawings, generally preferred embodiments and further developments of the teaching will be explained. In the drawings FIG. 1 is illustrating schematically a network virtualization environment, FIG. 2 is illustrating a preferred embodiment of a substrate node architecture for use with the inventive method, FIG. 3 is illustrating schematically three substrate nodes in connection with two virtual networks, FIG. 4 is a global view of a preferred embodiment of a self-organizing control loop execution and FIG. 5 is a high level view of an embodiment of a self-organizing model.

DETAILED DESCRIPTION OF THE INVENTION

Figure 1:
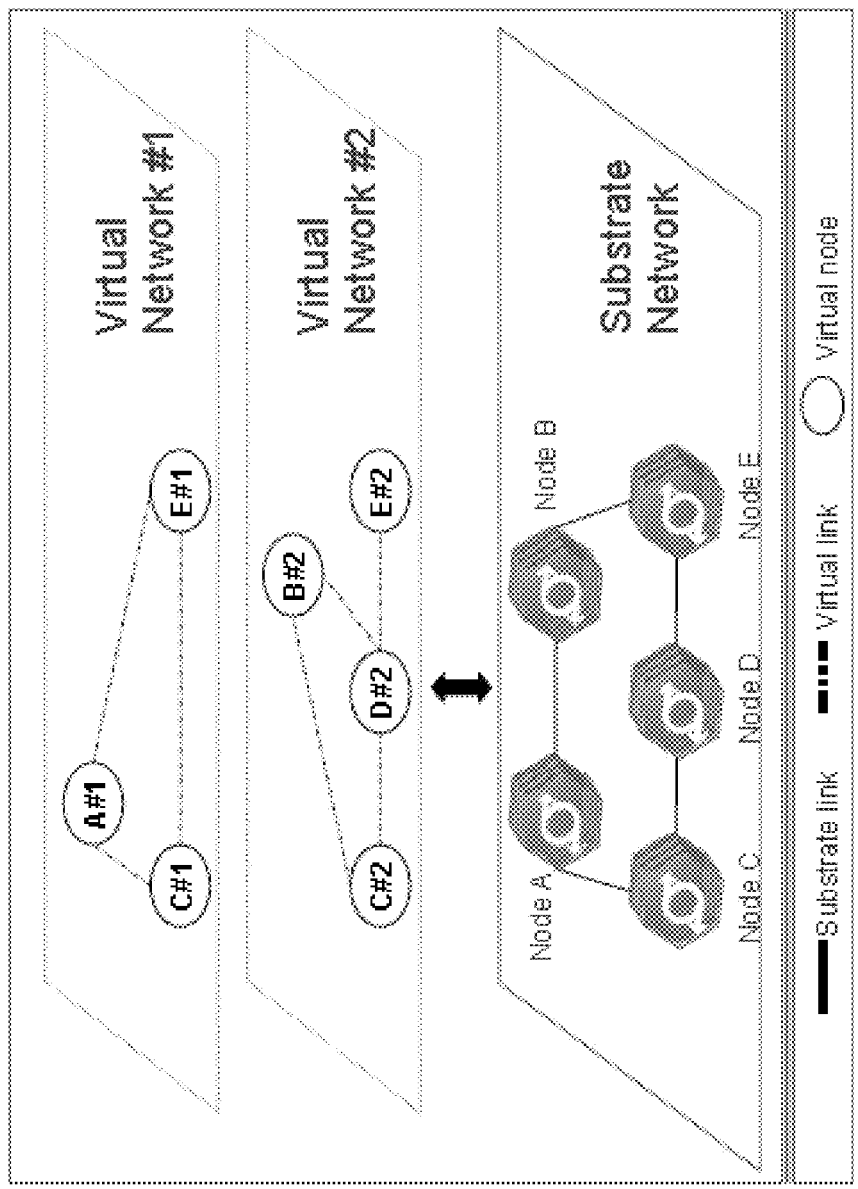

FIG. 1 is illustrating schematically an embodiment of a network virtualization environment for use with the inventive method. The substrate network comprehends all physical resources belonging to an infrastructure provider, and the virtual networks (VN) are slices of the substrate network resources attributed to virtual providers. Virtual links are connections between two adjacent virtual nodes of the same virtual network. As illustrated in FIG. 1, virtual links can be directly mapped to substrate links (e.g., Virtual Network #2), or become cut-through traffic on some substrate node (e.g., Virtual Network #1, where the virtual link between A#1 and E#1 creates a cut-through traffic on "substrate node B").

A Virtual Node is a defined set of slices from substrate node resources. Typically, this set of slices is composed of: CPU portion, memory space, application(s), bandwidth, and optionally storage capacity. An important aspect in the architecture of virtual nodes is the transparency. Virtual nodes from different virtual networks cannot see or exchange any type of information, in order to assure isolation among the providers. Additionally, the data exchanged in the virtual node is transparent to the substrate node provider to preserve the privacy of the customers. Nevertheless, some minimal primitives to inspect the activity of the different slices are normally available: as an example, primitives to allow the controller of the substrate resources to know the actual amount of computational resources used (e.g., CPU, memory or disk) and traffic consumption.

Figure 2:
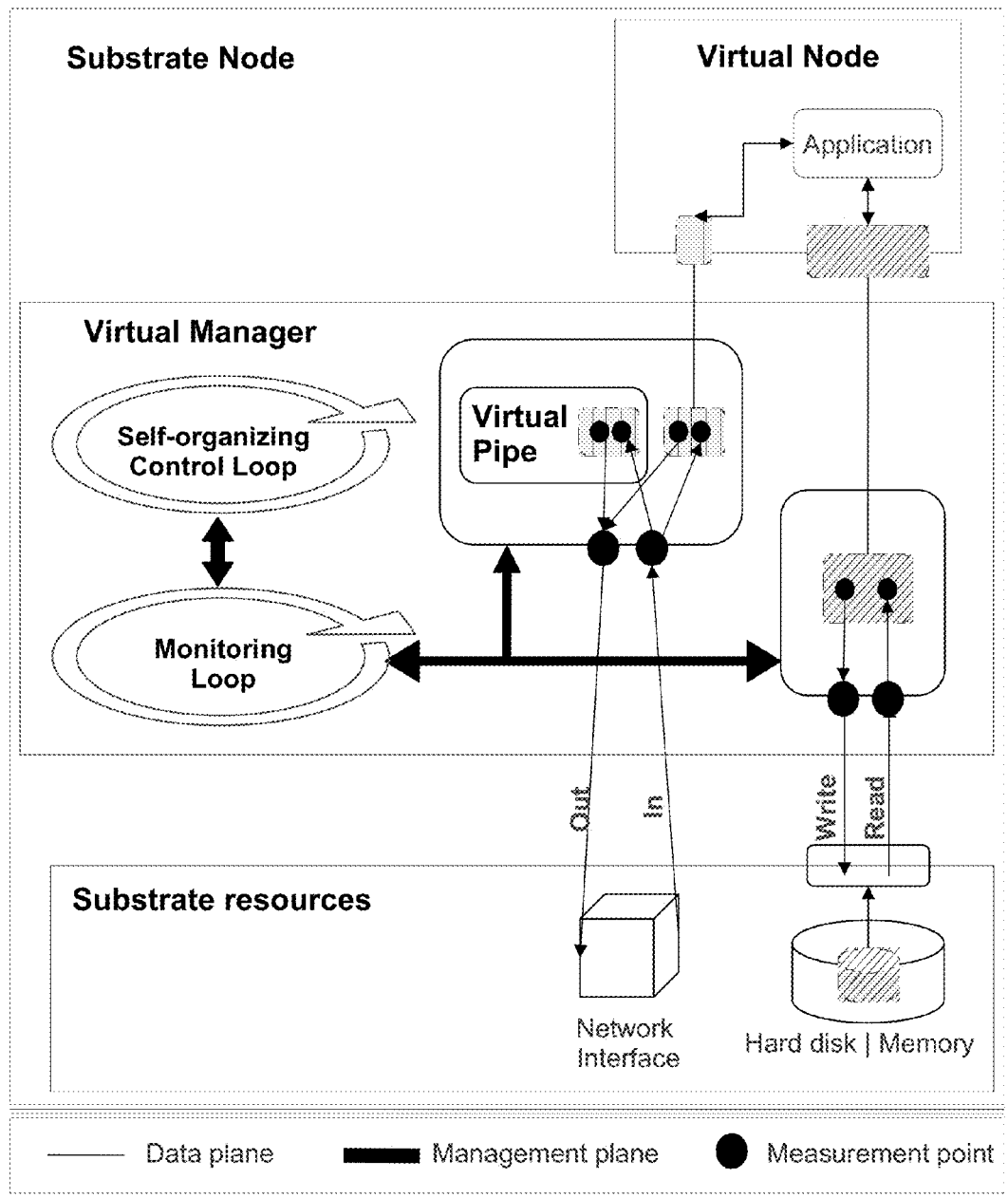

FIG. 2 is schematically illustrating a preferred substrate node architecture. In order to provide the requested transparency and isolation there is used the concept of a virtual manager. The virtual manager is responsible for monitoring resource information related to the self-organizing model and executing the self-organizing algorithm or method. As presented in FIG. 2, the Monitoring Loop gathers information from the relevant measurement points for the self-organizing model. Within the present invention, the relevant information is the amount of network traffic—the box in the middle of the virtual manager module—and reads/writes—the right box on the virtual manager module—of each virtual node deployed on the substrate node.

However, the resource consumption of a substrate node is not only related to the virtual nodes deployed inside it. As illustrate in FIG. 1 there are cases where cut-through traffic is using the network resources of the substrate node, but no virtual node is associated to the consumed resources. It can be assumed that the explicit identification of who is consuming the resources of a substrate node is essential for deciding how to organize the virtual networks elements inside the substrate network. So far, there is defined the Virtual Pipe concept in order to identify and monitor also cut-through traffic inside a substrate node. Virtual pipes are different from virtual nodes, in the sense that they are not visible in the virtual network topology, and they don't have any other substrate resource associated than network traffic passing-by.

The reduction of cut-through traffic inside the substrate network is an important feature of the present self-organizing model. To achieve this feature, it is defined an algorithm or method running inside the Self-organizing Control Loop that is executed in parallel by every substrate node. This algorithm is able to reduce the number of cut-through traffic by moving a virtual node associated to this kind of traffic to the substrate node where the cut-through traffic is passing by. Using heuristics, also defined for the self-organizing model, the traffic pattern is identified and the moving mechanism is activated. The huge difference for the current researches on resource consumption is the local view to characterize the traffic pattern, and the completely distributed execution of the evaluation and decision to execute the reallocation of resources.

In the following a preferred embodiment of a self-organizing model will be explained in further detail:

As briefly described in the last section, the self-organizing model is mainly characterized by the use of local information to identify bottlenecks situations, and by the full distributed decision-making process to reallocate the virtual resources. In this section, we show the virtual manager roles and how they are related to the heuristics defined to characterize traffic patterns. We also show the heuristics themselves, and the self-organizing control loop.

A virtual manager is designed to be an autonomous entity that takes decisions to reduce the resource consumption based only on the information monitored on its substrate node. So, when a link of a substrate node is identified as overload the virtual manager triggers the process to identify the traffic pattern of each virtual network using the resources of this substrate node. The goal is to identify whether some of the virtual networks is presenting the pattern associated with cut-through traffic. If such pattern is verified in the overloaded link, the virtual manager takes the applicable actions to eliminate this traffic from the link (these decisions will be described later in this section).

Figure 3:
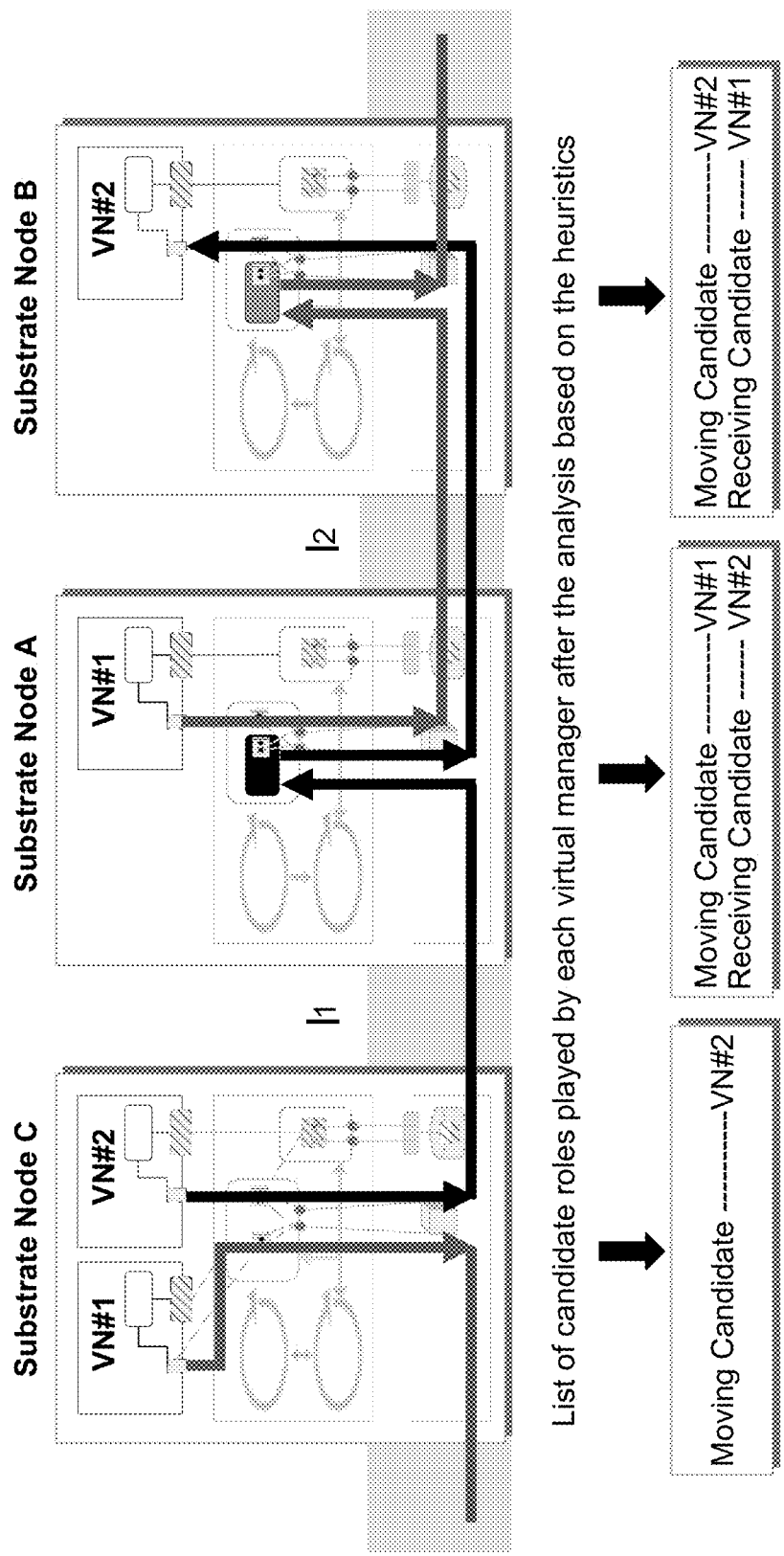

We named the pattern associated with cut-through traffic as "forward traffic". The full description of a forward traffic is a flow departing from a virtual node, passing-by virtual pipes (or even virtual nodes) of the same virtual network, and arriving in a distinct virtual node also belonging to the same virtual network. FIG. 3 shows examples of forward traffic on virtual networks #1 and #2 (respectively VN#1 and VN#2). In the case of VN#1, the flow departs from substrate node A, passes through the virtual pipe on substrate node B and is being forwarded until it reaches the destination. Considering the case of VN#2 the flow departs from substrate node C, passes-by the virtual pipe on substrate node A, and reaches the destination on substrate node B.

Let's suppose that the links $I_1$ and $I_2$ (both belonging to $L^s$—Table I) are considered overloaded by the virtual managers of substrate nodes C/A, and A/B, respectively. Link $I_1$ has only the traffic flow from VN#2, while link $I_2$ contains traffic flows from both virtual networks. The challenge of the self-organizing algorithm running within the virtual managers is to "guess" if the flows inside these links match the forward traffic pattern without getting any extra information than the resources locally used by the virtual network.

We explicitly use the term "guess" to characterize the uncertainty of our identification process. This uncertainty exists because we do not inspect the content of the traffic running inside the virtual network, but we just account the amount of resources used by this network. Thus, our non precise identification is accomplished by heuristics defined to search for the forward pattern among the clues given by the resources consumed by each virtual network inside the substrate nodes.

One might consider that the presence of a virtual network in a substrate node can be accomplished by the virtual elements pipes or nodes, and the substrate resources associated to these elements are different. So, the guessing process is different for virtual pipes and for virtual nodes, and for this reason two heuristics were elaborated. The first one is called receiving candidate heuristic and investigates the resources used by a virtual pipe associated with the virtual network. The second one is named moving candidate heuristic and it tries to identify a forward traffic pattern when a virtual node of a virtual network is deployed on the substrate node. The details of these heuristics will be explained in the sequence.

The output of the heuristics is a list of virtual nodes to be received or moved. These lists are called, respectively, receiving and moving candidate. An example of this output is presented in FIG. 3. The self-organizing algorithm running in the substrate node C identified the virtual node of VN#2 as a moving candidate, while substrate nodes A and B identified virtual nodes from VN#1 and VN#2 as moving candidates, and virtual pipes from VN#2 and VN#1 as receiving candidates.

Based on the traffic pattern characterization, and the cost evaluation of a reorganization of virtual resources (details about the cost evaluation are described later on), the virtual manager of each substrate node take the actions to reorganize the resources of the virtual networks identified in the candidate lists (details of the reorganization mechanism will be described in the end of this section). Below, we present the details of the decision-making to reorganize the resources. The notation used in the following subsections is described in Table I, and we use superscript to denote whether we are specifying a virtual or a substrate element, and subscript to identify the indexes of such elements.

TABLE I

NOTATIONS OF SELF-ORGANIZING MODEL

| | |
|---|---|
| B | Maximum bandwidth capacity of a link |
| T | Total amount of traffic |
| IN | Incoming traffic |
| OUT | Outgoing traffic |
| $N_{vi}^{sl}$ | Number of virtual links inside the substrate link |
| $L^s$ | List of links in a substrate node |
| $VL^s$ | List of virtual links inside a substrate link |
| $VNETL^s$ | List of substrate links of a virtual network in a substrate node |
| $OvLink^s$ | List of overloaded links in a substrate node |
| $OvVLink\_l^s$ | List of overloaded virtual links in a substrate link |
| $read^v$ | Amount of reads of virtual node |
| $write^v$ | Amount of writes of virtual node |

A. Identification of an Overloaded Substrate Link

The reorganization of virtual resources makes sense only if an overload resource is detected inside the substrate node. In our model an overloaded link is the element that starts up for the self-organizing algorithm. So, for each link $l_j^s \in L^s$ where i is the index of $L^s$, the condition presented in (1) verifies if the substrate link $l_i^s$ should be included in the list of overloaded substrate links $OvLink^s$.

$$l_i^s \in OvLink^s \text{ if } T\, l_i^s > B\, l_i^s * a \qquad (1)$$

If the $OvLink^s$ is not empty, the next step is to identify which virtual links inside each overloaded substrate link are consuming the resources. We defined two different functions to identify overloaded virtual link(s). First, we consider an equal use of the substrate link bandwidth among all virtual links inside it. The function EqualT( ) in (2) is applied for each substrate link $l_j^s \in OvLink^s$, where j is the index of the substrate link inside the list $OvLink^s$. The goal is to verify which virtual link(s) $l_k^v$ of substrate link $l_j^s$ are using more resources than the other virtual ones, where k is the index of the virtual network. For each substrate link $l_j^s$ is created the list $OvVLink\_l_j^s$ with the virtual link(s) $l_{kj}^v$, where $l_{kj}^v$ is the virtual link of virtual network k inside the substrate link $l_j^s$.

$$l_{kj}^v \in OvVLink\_l_j^s \text{ if } EqualT(l_j^s) = \text{true},$$
where
$$EqualT(l_j^s) = \begin{cases} \text{true} & \text{if } Tl_{kj}^v > Tl_j^s / |VL_j^s| \\ \text{false} & \text{otherwise,} \end{cases} \qquad (2)$$

The second alternative is presented in (3). The function MajorT( ) identifies the virtual link that is consuming the major part of the resources of the substrate link $l_j^s$. This alternative is different from the first one because its output is a unique virtual link $l_{kj}^v$ predominantly using the substrate link bandwidth.

$$l_{kj}^v \in OvVLink\_l_j^s \text{ if } MajorT(l_j^s) = \text{true},$$
where
$$MajorT(l_j^s) = \begin{cases} \text{true} & \text{if } Tl_{kj}^v \geq Tl_j^s - Tl_{kj}^v \\ \text{false} & \text{otherwise,} \end{cases} \qquad (3)$$

After the identification of the overloaded virtual link(s) inside a substrate link comes the moment to determine whether the flow(s) inside the virtual link(s) matches with the forward traffic pattern.

B. Receiving Candidate Heuristic

As described above, the receiving candidate heuristic is applied to identify a forward traffic when a virtual pipe element is associated with the overloaded virtual link inside the link $l_j^s$. In a reduced virtual network topology like the one presented in FIG. 3 the identification of a forward traffic pattern in a virtual pipe is trivial, because the input in one virtual/substrate link is the output in the other virtual/substrate link. However, a complex topology, where a virtual pipe is connect to more than two virtual links, requires a detailed correlation of the traffic flowing through the virtual links of this virtual pipe. The receiving candidate heuristic elaborated in this work considers these complex topologies.

We defined a set of conditions related to the traffic passing through the virtual pipe that must be analyzed before declaring a substrate node hosting this virtual pipe as a receiving candidate for the virtual network associated with this virtual element. The analysis of the virtual pipe traffic can be done comparing the incoming traffic against the outgoing traffic of the analyzed virtual link, or vice-versa. For the receiving candidate heuristic we based the analysis on the comparison of the incoming traffic against the outgoing traffic. The conditions listed below are applied for each virtual link $l_{kj}^v$ belonging to each $OvVLink\_l_j^s$ list.

Condition 1: Guarantees that no read and write is associated to the virtual network k.

$$ForwardT = \begin{cases} 1 & \text{if } (read_k^v = 0) \wedge (write_k^v = 0) \\ 0 & \text{otherwise} \end{cases}$$

Condition 2: Identify if the main traffic of $l_{kj}^v$ is an incoming traffic.

$$IN\_MainT = \begin{cases} 1 & \text{if } INl_{kj}^v \geq Tl_{kj}^v - INl_{kj}^v \\ 0 & \text{otherwise,} \end{cases}$$

Condition 3: Correlate the amount of incoming traffic of $l_{kj}^v$ with single outgoing traffic of the same virtual network in other substrate link belonging to $VNETL^s$. This correlation enables the identification of the case that all traffic arriving in $l_{kj}^v$ is being entirely forwarded to a single virtual link.

$$SingleOut = \begin{cases} 1 & \text{if } \forall\, l_y^s \in VNETL_k^s : INl_{kj}^v \geq OUTl_{ky}^v \\ 0 & \text{otherwise,} \end{cases}$$

Condition 4: Correlate the amount of incoming traffic of $l_{kj}^v$ with all outgoing traffic of the same virtual network in other substrate links belonging to $VNETL^s$. The goal of this condition is to detect whether the incoming traffic on $l_{kj}^v$ is forwarded to multiple distinct virtual links of the same virtual network.

$$MultipleOut = \begin{cases} 1 & \text{if } \forall\, l_y^s \in VNETL_k^s, \text{ and} \\ & y \neq j : IN_{kj}^v \leq (\Sigma_y OUT_{ky}^v) \\ 0 & \text{otherwise} \end{cases}$$

The final analysis presented in (4) is able to determine if the virtual link associated to virtual network under analysis on the substrate link $l_j^s$ is supposed to be inserted in the Receiving_Candidate_List of the substrate node. This list is a tuple <virtual network, virtual link>, where the first element of the tuple can have multiple entrances, but the second one is unique.

<vnetk,$l_{kj}^v$>∈Receibing_Candidate_List if ForwardT
∧ (IN_MainT ∨ (SingleOut ∨ MultipleOut))   (4)

The virtual manager of the substrate node will use the Receiving_Candidate_List during the negotiation phase to move virtual nodes from the virtual networks registered in this list.

C. Moving Candidate Heuristic

The moving candidate heuristic complements the analysis of a forward traffic considering the perspective of a virtual node. Different from the approach on the receiving candidate heuristic, we are not only interested in comparing the incoming traffic against the outgoing traffic of each virtual link $l_{kj}^v$ belonging to each OvVLink_$l_j^s$ list. For the moving candidate heuristic we have to identify if a virtual node is generating the outgoing traffic inside $l_{kj}^v$. In this work, we assume that a virtual node need to use other resources than just the virtual links to originate a traffic flow in $l_{kj}^v$. We consider that the virtual node also uses the resources from storage devices, like memory or hard disk. For example, a virtual streaming server needs to read the requested media from some storage before sending this data to the requester. Thus, for the moving candidate heuristic we want to identify a relationship between the outgoing traffic of link $l_{kj}^v$ with the amount of $read_k^v$ of the virtual network k. To establish these relationships a different set of conditions are required to identify the forward traffic pattern on a virtual node, and here as well, the conditions are applied for each virtual link $l_{kj}^v$ belonging to OvVLink_$l_j^s$.

Condition 1: The virtual network k must read data from its virtual storage slice.

$$ReadDate = \begin{cases} 1 & \text{if } (read_k^v > O) \\ 0 & \text{otherwise} \end{cases}$$

Condition 2: The outgoing traffic of $l_{kj}^v$ must be higher than the incoming traffic of the same virtual link.

$$OUT\_MainT = \begin{cases} 1 & \text{if } OUT_{kj}^v \geq T_{kj}^v - OUT_{kj}^v \\ 0 & \text{otherwise,} \end{cases}$$

Condition 3: The outgoing traffic of $l_{kj}^v$ must be associated to an amount of data retrieved from $read_k^v$. The problem here is that it is not possible to identify directly the amount of data read from the virtual storage and forwarded through $l_{kj}^v$, because we do not inspect any kind of data packet of the virtual network. So, the only way to identify the amount of reads flowing as outgoing traffic of $l_{kj}^v$ is defining a similarity relation between the outgoing traffic of $l_{kj}^v$ and the resources consumed by the virtual network k. So far, we defined a similarity function Sim( ) that determines if a given amount of $read_k^v$) belongs to the "similarity interval" of the outgoing traffic of $l_{kj}^v$.

$$Sim(l_{kj}^v, V) = \begin{cases} 1 & \text{if } SimBottom(l_{kj}^v) \leq V \geq SimUP(l_{kj}^v) \\ 0 & \text{otherwise,} \end{cases}$$

where,
SimBottom($l_{kj}^v$)=$l_{kj}^v$−($l_{kj}^v$*δ),
SimUP($l_{kj}^v$)=$l_{kj}^v$+($l_{kj}^v$*δ), and
V=(($\Sigma_y$IN $l_{kj}^v$)+$read_k^v$)−(($\Sigma_z$OUT$_{kz}^v$)+$write_k^v$),
where δ∈ℜ :0≤δ≤1, y, z are the index of VNETL$_k^s$, and z≠j.

The list Moving_Candidate_List is created after the analysis presented in (5), and this list is also composed of the tuple <virtual network, virtual link>.

<vnet$_k$,$l_{kj}^v$>∈Moving_Canditate_List if ReadData
∧ OUT_MainT ∧ Sim($l_{kj}^v$,V)   (5)

In the sequence, we present the self-organizing control loop that analyzes the traffic of the substrate links according to both heuristics described above, and then if necessary applies a moving mechanism to reallocate the virtual resources.

D. Self-organizing Control Loop

Figure 4:
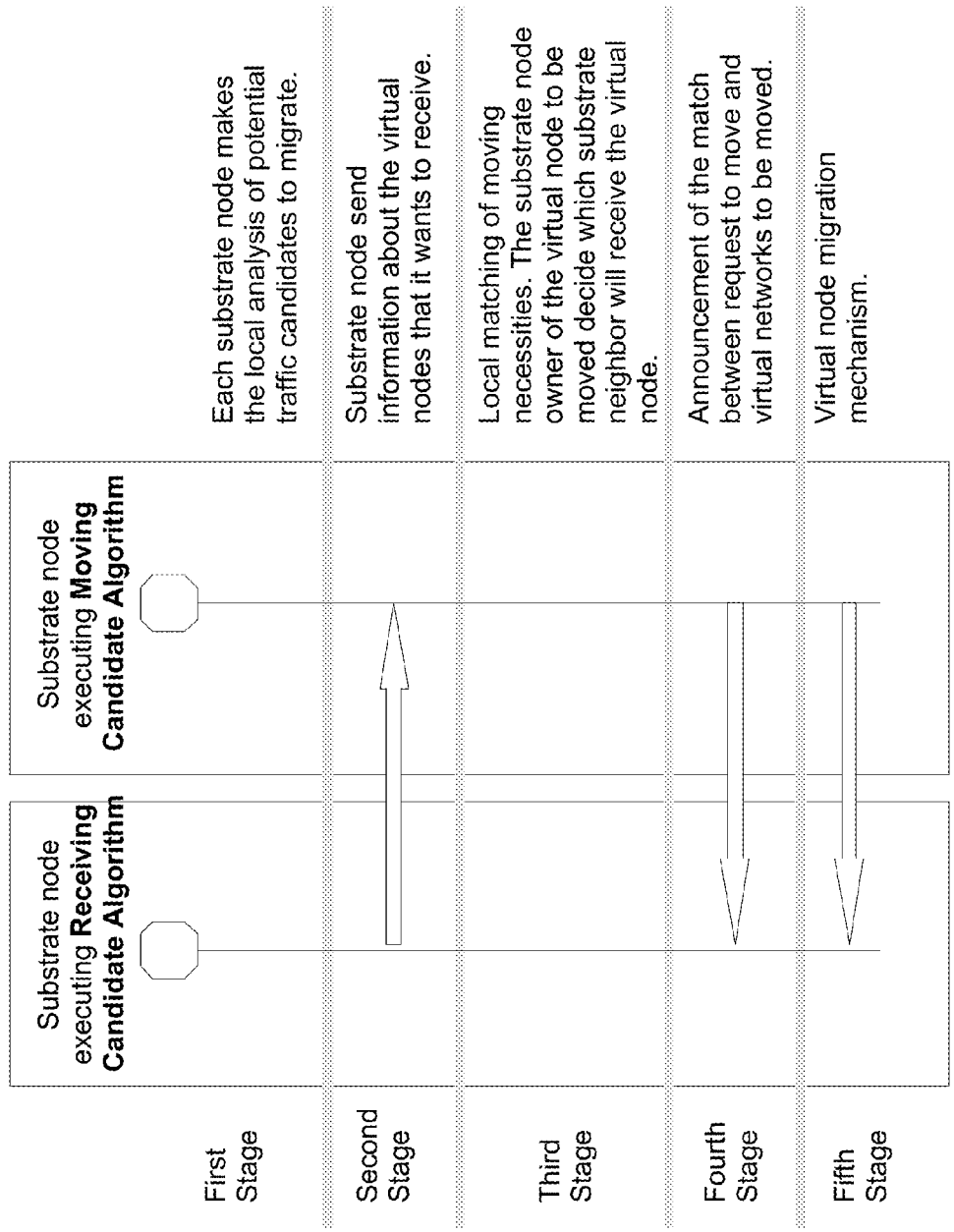

The global view of the self-organizing control loop is presented in FIG. 4. The white circles denote local analysis and the black arrows indicate communication between substrate neighbor nodes. One cycle of the control loop is composed of five stages which are detailed in Algorithms 1, 2 and 3.

The first stage is characterized by the analysis of the conditions that trigger the reallocation of the virtual resources, and is depicted in Algorithm 1. The equations previously described in this section are used in this stage to locally identify the status of the resources in a substrate node. After the creation of receiving and moving candidate lists (between steps 1 and 4 of Algorithm 1) the Algorithms 2 and 3 are executed in parallel in the same substrate node, as stated in "Step 6" of Algorithm 1. However, to simplify the illustration of the execution of those algorithms, FIG. 4 brings the view of one substrate node only executing Algorithm 2 (left substrate node on FIG. 4) while the other node executes Algorithm 3 (right node of FIG. 4).

| Algorithm 1 Self-organizing Control Loop | |
|---|---|
| Step 1 | Create OvLink$^s$ list based on L$^s$ (based in Equation (1)). |
| Step 2 | Create OvVlink_$l_j^s$ for each $l_j^s$ in OvLink$^s$ (based in Equation (2) or (3)). |
| Step 3 | For each link $l_{kj}^v$ in OvLink$^s$ verify if it belongs to Receiving_Candidate_List (based in Equation (4). |
| Step 4 | For each link $l_{kj}^v$ in OvLink$^s$ verify if it belongs to Moving_Candidate_List (based in Equation (5). |
| Step 5 | If Receiving_Candidate_List and Moving_Candidate_List are empty, GOTO Step 7. |
| Step 6 | Execute Algorithm 2 and Algorithm 3. |
| Step 7 | Wait next self-organizing control loop cycle and GOTO Step 1. |

The second stage of the self-organizing control loop (FIG. 4) regards to the moment that the substrate node "willing to receive" a virtual node get in contact with the substrate neighbor supposably hosting the virtual node of the virtual network vnetk. However, there is no guarantee that the substrate neighbor hosts the required virtual node, because the substrate node sending the request knows nothing about the virtual elements of its neighbors. It just knows that there is a virtual element associated to the virtual network vnetk on that neighbor. We assume this lack of knowledge in order to maintain the transparency not just inside a substrate node, but also between substrate neighbors. Moreover, we also assume that a request to initiate the migration of virtual resources must not be forwarded, i.e., this is a non-transferable message.

| Algorithm 2 Receiving Candidate Algorithm | |
| --- | --- |
| Step 1 | For each $vnet_k$ in Receiving_Candidate_List find the most overloaded link $l_{kj}^y$ and send request for the substrate neighbor node of this link to move the virtual node of $vnet_k$. |
| Step 2 | For each request wait for the reply of the substrate neighbor during an interval of time t. |
| Step 3 | If the reply for the request to move the virtual node of $vnet_k$ is received during interval t, activate migration under the perspective of substrate node that receives the virtual node. |
| Step 4 | If fail in Step 3 or timeout of interval t for $vnet_k$, remove all tuples with $vnet_k$ from Receiving_Candidate_List. |

| Algorithm 3 Moving Candidate Algorithm | |
| --- | --- |
| Step 1 | For each $vnet_k$ in Moving_Candidate_List wait an interval of time t for a request to move the virtual node associated with $vnet_k$. |
| Step 2 | If the request to move a virtual node of $vnet_k$ is received within interval t, GOTO Step 3, otherwise, discard message. |
| Step 3 | If there is a $vnet_k$ on Moving_Candidate_List that matches with the received request, GOTO Step 4, otherwise, send a negative reply to substrate node owner of the received request and GOTO Step 5. |
| Step 4 | If the cost-efficient relation is positive for $vnet_k$, send a positive reply message to substrate neighbor, remove all tuples with $vnet_k$ from Moving_Candidate_List, and activate migration under the perspective of substrate node that moves the virtual node. |
| Step 5 | Wait until interval t to receive request for $vnet_k$, and if received GOTO Step 2. |
| Step 6 | If fail in Step 4 or timeout of interval t for $vnet_k$, remove all tuples with $vnet_k$ from Moving_Candidate_List. |

Figure 5:
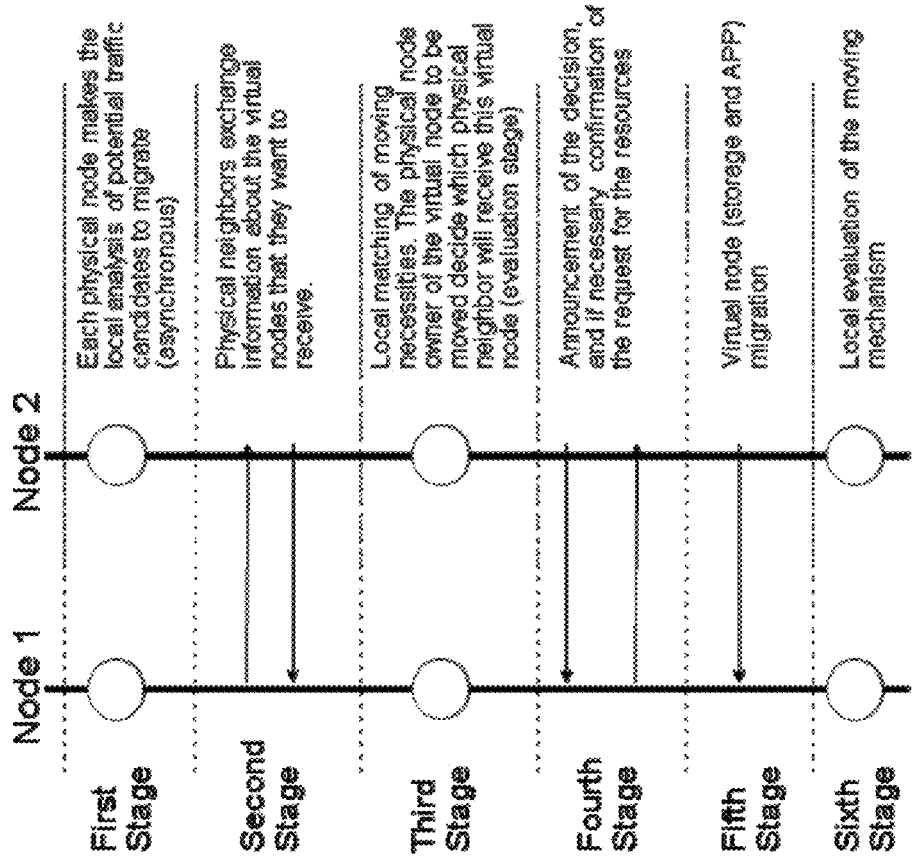

Important aspects of the presented self-organizing model are explained with regard to a high level view of self-organizing model according to FIG. 5 as follows:

The following are the steps in the process to be performed
   Identify potential bottleneck/in-balance in a physical node
      Based on the physical node monitoring: Relation between virtual node and resource usage has to be considered. The monitoring must maintain the information on per Virtual Node bases.
   Find certain resource usage patterns with the information of the neighboring nodes
      Relation among: total node traffic, each virtual traffic, total storage operations, each virtual storage operations
   Decision about the move
      Calculate the costs of movement against gain in optimization
      Available resources, virtual nodes and virtual tunnels
      Interruption time due to movement
      Take into account constraints from the provisioning process
   Move the location of virtual node
   Move all virtual node out of a physical node
      Due to shutting off a node in a planned way (maintenance, energy saving)
      In this case, a node forces to push out all the Vnodes, this might create a chain reaction, the mechanism requires additional to not move back VNs to a shutting down node
   Evaluate the quality of the overall network after moves
      Allows for learning patterns, which are bad for the overall network performance→might be done centrally with the overall network knowledge, or with just the local knowledge
      Keep track of the move history and evaluated the history and detect oscillations and potentially stop them
Details about Monitoring
   Monitor: resources usage per Virtual network, for example in and out traffic, read and writes on the memory or hard disks, CPU usage;
   Real time on-going monitoring of that resource usage
   Apply some filtering to the monitor:
      For example: in non-transparent case: monitor only the important parts not the control and management traffic of the application running in the Virtual Node.
Centralized Algorithm
   Collection of the monitored data, and evaluation and decision making in central location, then initiate the move mechanisms through configuration commands.
Offer-Based, Decentralized Algorithm
   Nodes make local decision on whether it can offer to take a Virtual Node, instead of hosting a pipe/cut-through traffic of that Virtual Network.
   Each physical node creates a list of virtual network ids which it could take based on the detected pattern. It includes the available resources for the possible future Virtual Nodes movement.
   The physical nodes that want to receive some virtual node, and eliminate their cut-through traffic send an offer to the neighbor physical node hosting the virtual node that is intended to be moved.
   The physical node that receives the offer will analyze this offer, and try to find some match inside the list of virtual nodes that it wants to send to other nodes (this list was created in parallel by all physical nodes executing the algorithm).
   A node receiving one or more offers makes a decision on what Virtual Node to give away. This node must be in the candidate list. The decision in case of several offers received for a virtual node is again based on the traffic pattern and the resource availability of the offers received.
   Additionally, the decision of being moved can be influenced by constraints given at the time of provisioning, or command saying all nodes must be moved out (due to shutdown of the physical node) makes the move a must.

Heuristics to determine the traffic pattern

> First Stage – Heuristic for forward traffic
> Self-organizing algorithm – Traffic Identification

- There are 2 perspectives to identify the forward traffic in a distributed fashion

Figure 6:
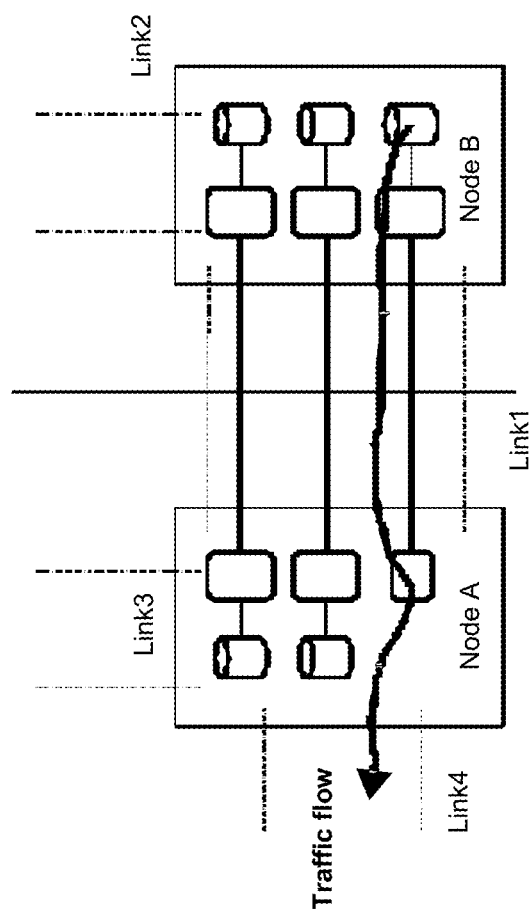
FIG. 6 is illustrating forward traffic flow between nodes.

- Both perspectives are always analyzed in every physical node (see Fig. 6)

| Receiving Candidate (Node A) | Moving Candidate (Node B) |
  |---|---|
  | Analyze by the perspective of the physical node that is receiving the traffic and forwarding | Analyze by the perspective of the physical node that is reading the information from the storage and sending it to another node | o The analysis of the receiving or moving candidates can be done observing the incoming or outgoing traffic associated to each physical link in each physical node
  - For example, the illustrated traffic flow (under the perspective of physical node A) can be analyzed as the incoming traffic of link1 or as outgoing traffic on link4.

o We decided to fix the analysis of each link starting to look to the incoming traffic and relating this traffic with the reading and writes and outgoing traffic.
  - For example, the illustrated traffic flow (on link1) will be analyzed on Node B because there is low incoming traffic, high read and high outgoing. While on Node A there will be a high incoming traffic, and low outgoing traffic.

Figure 7:
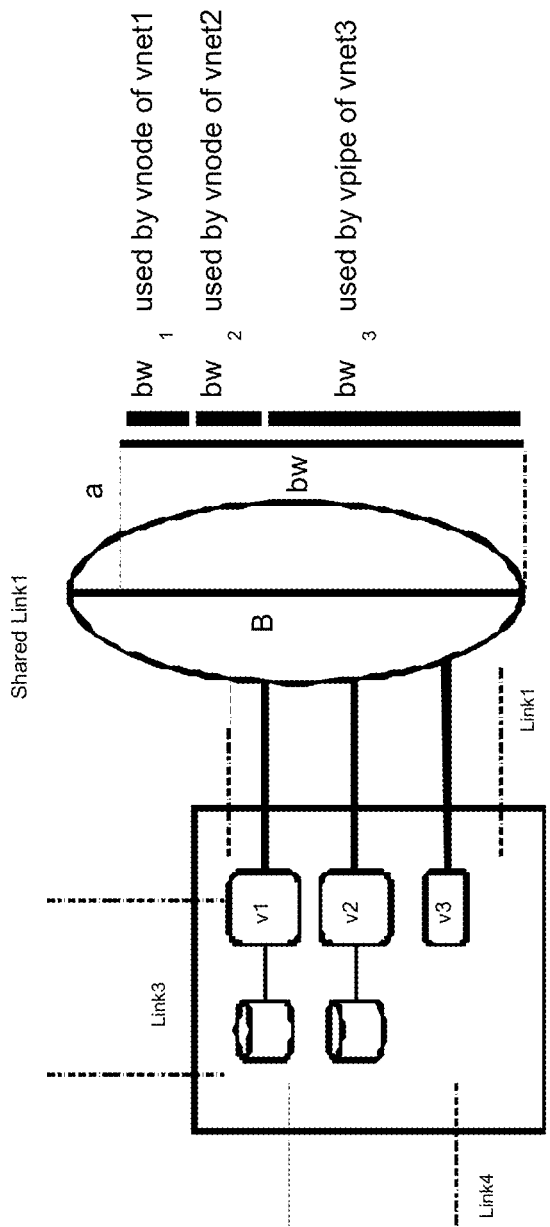
FIG. 7 is illustrating a shared link.

First Stage – Heuristic for forward traffic
General Issues for Identification Within Fig. 7 are shown:

B – nominal capacity of shared link a – threshold to determine the moment where some re-organization is needed in the link (expressed as percentage of the channel capacity)_ bw – total amount of bandwidth used inside the shared link, where j is the id of the link bw – amount of bandwidth used by each vnet inside the shared link, where i is the id of the vnet Issues to be identified:
1. Is the shared link overloaded?
2. Is there some traffic using the major resources of the shared link?
3. Is this a forward traffic? (Receiving candidate)
4. Is this forward traffic mainly an incoming traffic? (Receiving candidate)
5. Is this virtual node the source element generating traffic? (Moving candidate)

Figure 8:
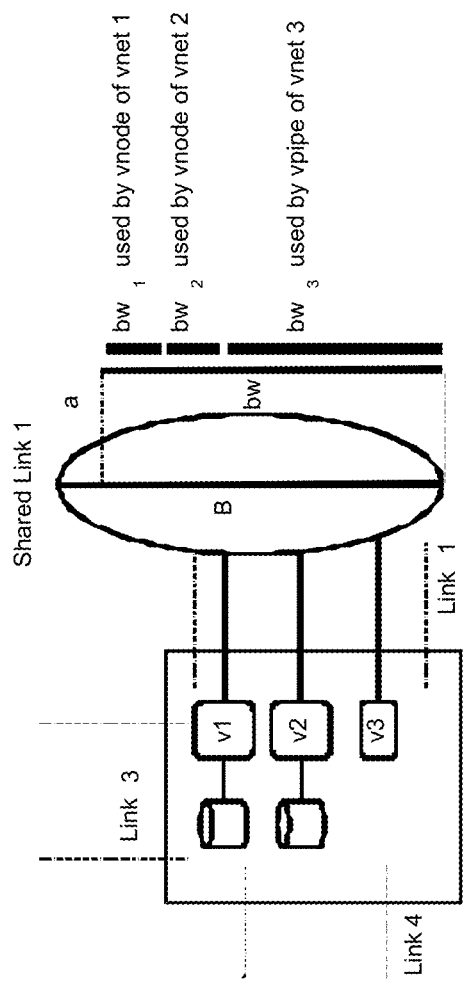
FIG. 8 is illustrating a shared link.

First Stage – Heuristic for forward traffic
General Issues for Identification Within Fig. 8 are shown:

B – nominal capacity of shared link a – threshold to determine the moment where some re-organization is needed in the link (expressed as percentage of the channel capacity)_ bw – total amount of bandwidth used inside the shared link, where j is the id of the link bw – amount of bandwidth used by each vnet inside the shared link, where i is the id of the vnet 1. Is the shared link overloaded? ⮕ ( bw > B x a )_

2. Is there some traffic using the major resources of the shared link?

( $bw_i$ > (bw / (num vpipe + num vnode))) → Means that the resources of the channel are not equally distributed or ($bw_i$ >= bw − $bw_i$)_ → Means that the traffic associated with vnet i is the predominant traffic inside the shared link

First Stage – Heuristic for forward traffic
Receiving Candidate Identification (Pipe)

Figure 9:
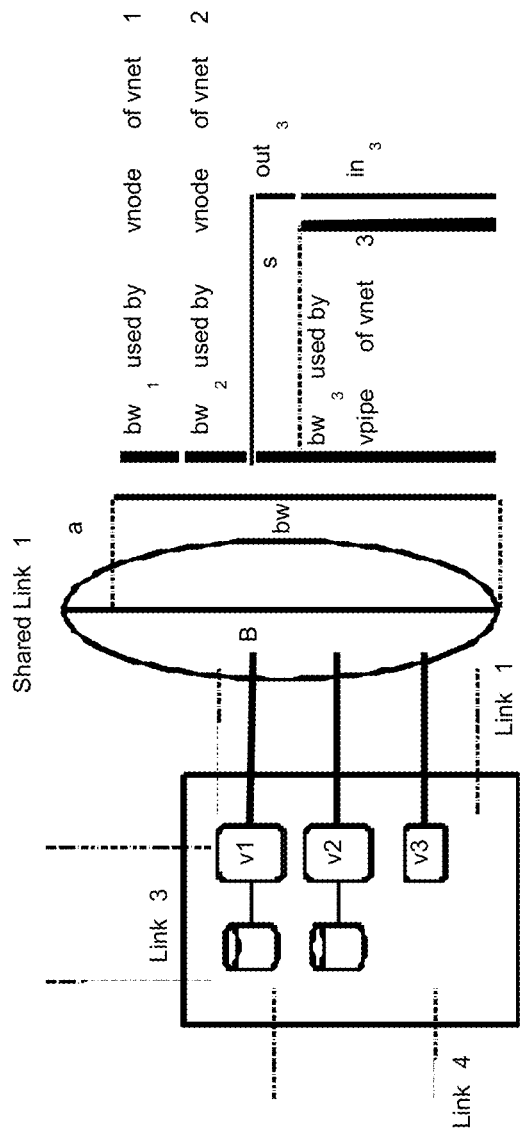
FIG. 9 is illustrating receiving candidate identification.

Within Fig. 9 are shown:

B – nominal capacity of shared link a – threshold to determine the moment where some re-organization is needed in the link (expressed as percentage of the channel capacity) _

$bw_j$ – total amount of bandwidth used inside the shared link, where j is the id of the link $bw_{ij}$ – amount of bandwidth used by each vnet inside the shared link, where i is the id of the vnet 3. Is this forward traffic?

$(readv_i = 0)$ and $(writev_i = 0)$ and $(in_{ij} > 0)$ and $(S(out_i) > 0)\_$

4. Is this forward traffic mainly an incoming traffic?

$(in_{ij} > bw_{ij} * s)$ or $(($ any $k ? L : (in_{ij} >= out_{ij}))$ or $(t ? L$ and $t <> j : (in_{ij} <= S_{t=0}(out_{it})))$ and $(in_{ij} >= out_{ij}))$, where L is the set of physical link ids,

First Stage – Heuristic for forward traffic
Moving Candidate Identification (Node) _

Figure 10:
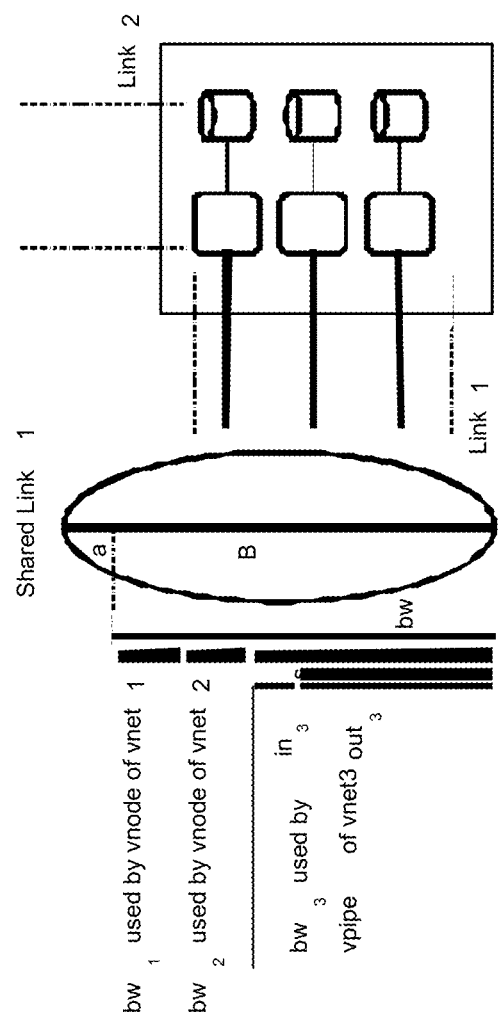
FIG. 10 is illustrating moving candidate identification.

Within Fig. 10 are shown:

B – nominal capacity of shared link a – threshold to determine the moment where some re-organization is needed in the link (expressed as percentage of the channel capacity)_

$bw_j$ – total amount of bandwidth used inside the shared link, where j is the id of the link $bw_{ij}$ – amount of bandwidth used by each vnet inside the shared link, where i is the id of the vnet s – threshold to determine if the out bandwidth is greater than the in The moving candidate identification does not need to identify where the vnode should be moved, i.e., which is the exact link where the generated traffic is flowing. It will wait the requests to move do decide.

5. Is this virtual node the source element generating traffic?

$(readv_i > 0)$ and $(out_{ij} > bw_{ij} \times s)$ and
$($any $k^i ? L : (out_{ik} >= in_{ik}),$ where k belongs to $\{0.. n\}$, $k <> j$, and n is the number of physical neighbors$)$

First Stage – Heuristic for application traffic
Self-organizing algorithm – Traffic Identification

Figure 11:
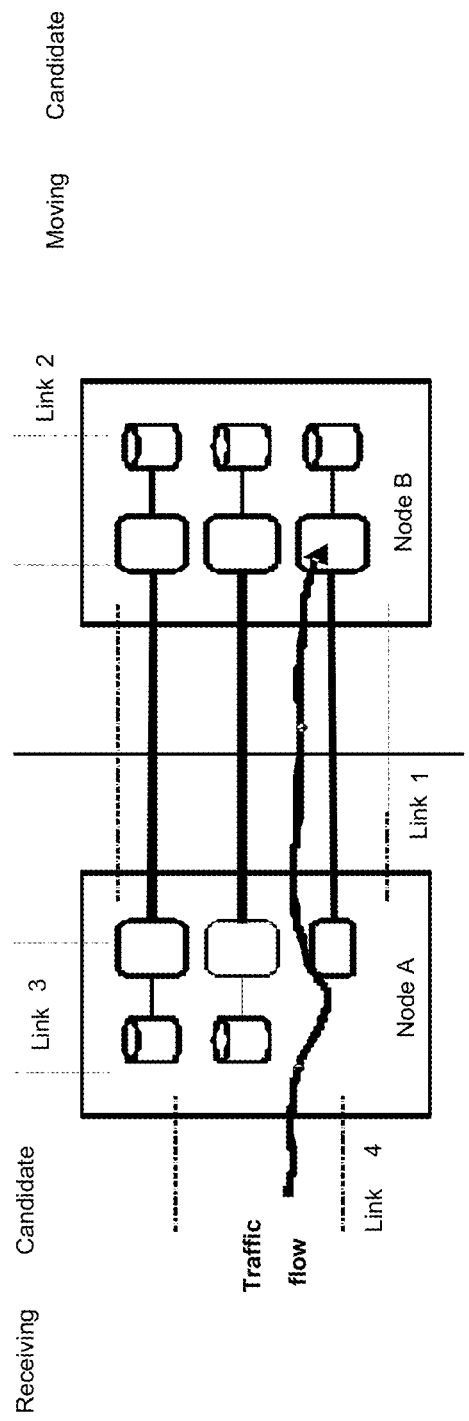
FIG. 11 is illustrating traffic flow between nodes.

- The application traffic pattern is similar to the forward traffic in the sense of presenting the same 2 perspectives: receiving and moving (see Fig. 11)

- The difference is the type of resources involved during the analysis to identify the application traffic

- CPU and memory consumption are the main elements to recognize this pattern, because incoming data is not being forwarded to other nodes or written on the storage CPU and memory analysis to recognize the application traffic just make sense on the physical nodes that have a virtual node associated to the vnet; i.e., on the moving candidate

First Stage – Heuristic for application traffic
Moving Candidate Identification (Node)

Figure 12:
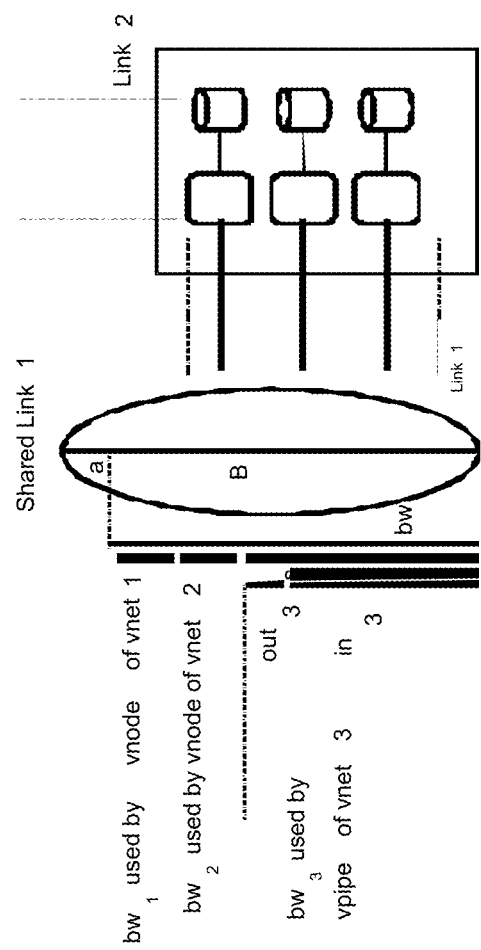
FIG. 12 is illustrating moving candidate identification.

Within Fig. 12 are shown:

B – nominal capacity of shared link a – threshold to determine the moment where some re-organization is needed in the link (expressed as percentage of the channel capacity)

$bw_j$ - total amount of bandwidth used inside the shared link, where j is the id of the link $bw_i$ - amount of bandwidth used by each vnet inside the shared link, where i is the id of the vnet The moving candidate identification does not need to identify where the vnode should be moved, i.e., which is the exact link where the generated traffic is flowing. It will wait the requests to move do decide.

s - threshold to determine if the in bandwidth is greater than the out

6. Is the application inside the virtual node consuming some incoming traffic?

$(bw_{in} > bw_{x} \times s\,)$ and
$(current\_cpu_v > total\_cpuv \times f\,)$ and $(current\_memv > total\_memv \times ?\,)$ and
$(\,(sum(in) + readv\,) - (sum(out) + writev\,) > 0)$, where f is a percentage used to characterize of CPU overload, and ? is a percentage used to characterize memory overload

Second Stage
Send request to move resources

- After the local analysis of both perspective (receiving and moving candidates) each physical node verify if there is some vnet candidate to be received in the physical node
    - This means that the physical node has a virtual pipe associated to vnet candidate and this virtual pipe is requiring to receive the resources its vnet (thus becoming a vnode)
- For each vnet identified as receiving candidate, a request to move the resources of this vnet is sent to the physical node on the other side of the physical link being analyzed.
    - Inside this request there is also the announcement of the available resources on the physical node asking the movement

Second Stage
Receive request to move resources

- When a physical node receives a request to move the resources, it will check its internal list of moving candidates if there is a match for this request
    - If more than one request arrives (from different physical neighbors), the physical node will choose the neighbor with more resources and with lower moving cost

Third Stage
Evaluation Stage

Figure 13:
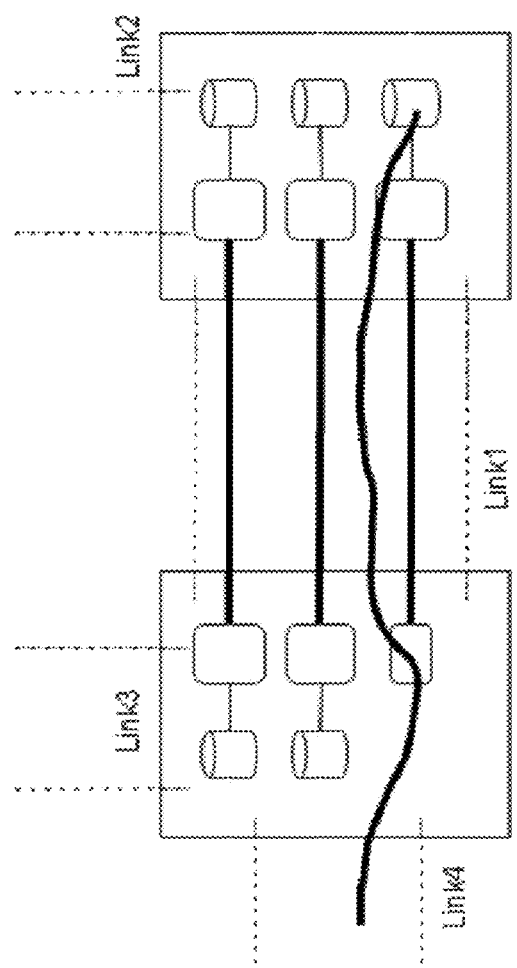
FIG. 13 is illustrating moving storage among nodes.

- The node with the storage to be moved decides to whom move the storage (among the neighbors that wants to receive the storage) (see Fig. 13)

Third Stage
Evaluation Stage - Criteria

- The storage available in the neighbor should be at least the same size of the storage to be moved $stoneig_n >= stov_i$

- Interruption time must not be greater than the one stipulated in the SLA $t_{interr} = stov_i / bw_i$

- Consider the constrains about physical links of the neighbors
  - Constrains restrict the movement of storages
  - Defined at the first placement of the virtual network

Third Stage
Evaluation Stage - Criteria

Figure 14:
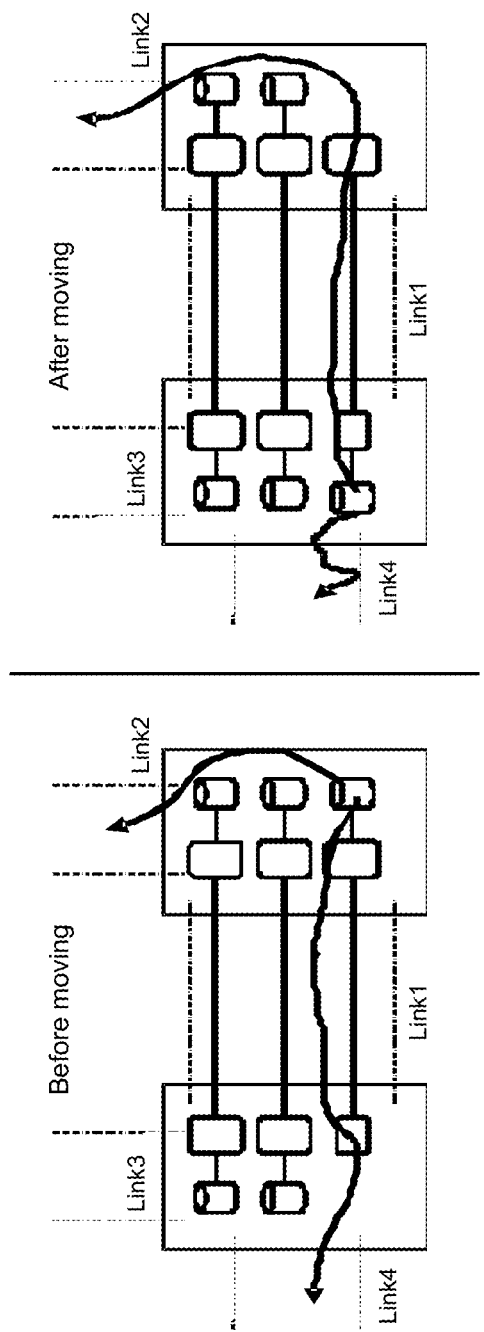
FIG. 14 is illustrating moving traffic among nodes.

- The amount of traffic out of vi in the analyzed node must be less than a percentage of the current $bwout_i$ on the analyzed link (see Fig. 14)

- Traffic out/in will became, after the moving, a traffic out/in on the analyzed link $$future\_out_i : sum(out_i) - out_{ij}$$
  $$future\_in_i : sum(in_i) - in_{ij}$$

$future\_out_j + future\_in_i <= bw_{ij} * O$, where O is a percentage

Forth Stage
Announcement of evaluation

- The physical node that received the request to move, and evaluated the viability sends the answer for the neighbors indicating if a match happened or not

| Fifth Stage       |
| Moving mechanism      |

- Perspective of the node that will RECEIVE the resources
  - All packets being forwarded to the vnode that will be moved are queued
  - The physical node request the basic information of the vnode to be moved and allocate the required resources
  - All information are moved
  - Virtual link connections are reestablished
  - Applications of vnode are reactivated
  - The packets are unqueued and processed locally

| Fifth Stage       |
| Moving mechanism      |

- Perspective of the node that will MOVE the resources
  - All packets arriving are queued
  - Applications are suspended
  - The physical node answer the basic information of the vnode to be moved
  - All information are moved
  - If necessary a vpipe is created
  - Virtual link connections are reestablished
  - The packets are unqueued and sent to the new location of the vnode > ## Sixth Stage
> ## Evaluation of the moving mechanism

- This stage is different from the 1st stage because it considers the not just the resources usage, but also the history of the self-organizations of the physical node
- The self-organization is based on heuristics and not optimal solutions, thus the decision of moving must be evaluated
- Associated to the moving action we defined a value
- Evaluation is based on the history of a vnet inside a physical node.
  - Depending to the number of times that the same vnet was moved, in the same physical node, a new constrain would be inserted on the evaluation criteria of third stage to avoid this vnet to be moved again.
  - Based on case-based reasoning (CBR) and reinforcement learning

Move of Virtual Node mechanism
- Data migration/code migration, (out of scope for this);
- Keep track for some time about movements in order to not moving back and forth;
- Incoming traffic queued;
- Storage and running VN suspended;
- Storage moved;
- Queue moved and played back to the vnode on the new location.

Aspects of the present invention together with preferred embodiments are:

1) Create relationship of local storage read writes with traffic in/out;
2) Algorithms based on local view and patterns for detecting transparently what is going on (without knowledge of the application/service within the virtual node);
3) The mechanism of moving the node without high interruption time, without loss of data;
4) More intelligent monitoring of only relevant data (when the service is known).

5) Allows for traffic engineering/load balancing of traffic and storage resources usage
6) Automatic way of controlling virtual networks (SON [Self-Organizing Networks] for VNET)
7) Ability to make only loose planning and provisioning algorithm and optimize on demand and in real-time:

Advantages of Invention
Transparent to services/applications.
Applying successful virtualization concepts of IT systems to networking.
Able to deal with dynamics of the offered load.
Easy applicable to IPTV deployments due to the resource types considered.
Keeping the topology of the virtual network (no need for re-routing within the virtual network).

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating at least one virtual network on a substrate network, or within a framework of a self-organizing model for optimizing resource consumption of the substrate network, where the virtual networks comprise a plurality of virtual nodes each being assigned to respective substrate nodes of the substrate network and two adjacent virtual nodes of the same virtual network are connected by a virtual link which is corresponding to one or more respective substrate node links, comprising the following steps:
    identifying a traffic pattern within at least two substrate nodes with regard to the resources individually consumed by the virtual networks;
    reallocating of the resources depending on an evaluation of the identified traffic patterns for optimizing resource consumption within the substrate nodes,
    wherein the identifying step and the evaluation and decision to execute the reallocation of resources is performed locally at each individual substrate node,
    after having identified an overloaded substrate link—the virtual link or links which is or are consuming the resources will be identified, and
    the identification of a forward traffic pattern comprises the comparison of the incoming traffic against the outgoing traffic of the analyzed virtual link, or vice versa.

2. The method according to claim 1, wherein the identifying step and the evaluation and decision to execute the reallocation of resources is performed by an autonomous entity—a virtual manager.

3. The method according to claim 1, wherein the identifying step is started when a substrate node link is identified as being overloaded.

4. The method according to claim 1, wherein for identifying an overloaded substrate node link there is provided a monitoring loop for monitoring of resource information which is including the amount of network traffic and reads/writes of each virtual node deployed on the substrate node.

5. The method according to claim 4, wherein the network traffic of a substrate node comprises the network traffic of each virtual node deployed on the substrate node and a cut-through traffic between virtual nodes which are not assigned to said substrate node.

6. The method according to claim 1, wherein the decision to execute the reallocation depends on the presence of cut-through traffic.

7. The method according to claim 1, wherein the reallocating step comprises a moving of at least one virtual node from one substrate node to another substrate node.

8. The method according to claim 1, wherein the identifying step is accomplished by heuristics defined to search for a traffic pattern associated with cut-through traffic, wherein such traffic pattern being designated as forward traffic.

9. The method according to claim 8, wherein the heuristics comprises a receiving candidate heuristic and a moving candidate heuristic resulting in lists of receiving and moving candidates, respectively.

10. The method according to claim 9, wherein a receiving candidate is a substrate node which is qualified as being suited for receiving a virtual node of a respective virtual network.

11. The method according to claim 9, wherein a moving candidate is a virtual node which is qualified as being suited for being moved from its actual substrate node to another substrate node.

12. The method according to claim 1, wherein it will be determined whether the outgoing traffic is generated by a virtual node of the substrate node.

13. A method for operating at least one virtual network on a substrate network, or within a framework of a self-organizing model for optimizing resource consumption of the substrate network, where the virtual networks comprise a plurality of virtual nodes each being assigned to respective substrate nodes of the substrate network and two adjacent virtual nodes of the same virtual network are connected by a virtual link which is corresponding to one or more respective substrate node links, comprising the following steps:
    identifying a traffic pattern within at least two substrate nodes with regard to the resources individually consumed by the virtual networks;
    reallocating of the resources depending on an evaluation of the identified traffic patterns for optimizing resource consumption within the substrate nodes,
    wherein the identifying step and the evaluation and decision to execute the reallocation of resources is performed locally at each individual substrate node,
    after having identified an overloaded substrate link—the virtual link or links which is or are consuming the resources will be identified, and
    it will be identified a relationship between the outgoing traffic of the virtual link with the amount of reads and/or writes of the virtual node from or to one or more storage devices within the substrate node.

14. A method according to claim 13, wherein the method will be realized within a self-organizing model or self-organizing control loop for optimizing resource consumption of the substrate network.

15. The method according to claim 14, wherein—after having identified an overloaded substrate link—the virtual link or links which is or are consuming the resources will be identified.

16. A virtual network environment on a substrate network, or within a framework of a self-organizing model for optimizing resource consumption of the substrate network, preferably for carrying out the method according to claim 13, wherein the virtual networks comprise a plurality of virtual nodes each being assigned to respective substrate nodes of the substrate network and wherein two adjacent virtual nodes of the same virtual network are connected by a virtual link which is corresponding to one or more respective substrate node links, comprising:
    a traffic pattern identifier to identify traffic within at least two substrate nodes with regard to the resources individually consumed by the virtual networks;
    a resource reallocator to reallocate resources depending on an evaluation of the identified traffic patterns for optimizing resource consumption within the substrate nodes,
    wherein the identifying step and the evaluation and decision to execute the reallocation of resources is performed locally at each individual substrate node.

17. A method for operating at least one virtual network on a substrate network, or within a framework of a self-organizing model for optimizing resource consumption of the substrate network, where the virtual networks comprise a plurality of virtual nodes each being assigned to respective substrate nodes of the substrate network and two adjacent virtual nodes of the same virtual network are connected by a virtual link which is corresponding to one or more respective substrate node links, comprising the following steps:
    identifying a traffic pattern within at least two substrate nodes with regard to the resources individually consumed by the virtual networks;

reallocating of the resources depending on an evaluation of the identified traffic patterns for optimizing resource consumption within the substrate nodes, wherein the identifying step and the evaluation and decision to execute the reallocation of resources is performed locally at each individual substrate node, the method will be realized within a self-organizing model or self-organizing control loop for optimizing resource consumption of the substrate network, and the self-organizing model or control loop comprises at least five stages which are including:
1) at least two or each substrate node makes a local analysis of potential candidates to migrate,
2) substrate node sends information about the virtual node or nodes that it wants to receive,
3) local matching and/or negotiating of moving necessities, wherein preferably the substrate node or substrate node owner of the virtual node to be moved decides which substrate neighbour will receive the virtual node,
4) announcement of the match between request to move and virtual node to be moved,
5) virtual node migration mechanism.

18. The method according to claim 17, wherein the self-organizing model or control loop further comprises as the sixth stage a local evaluation of the migration or moving mechanism.

19. A virtual network environment on a substrate network, or within a framework of a self-organizing model for optimizing resource consumption of the substrate network, preferably for carrying out the method according to claim 17, wherein the virtual networks comprise a plurality of virtual nodes each being assigned to respective substrate nodes of the substrate network and wherein two adjacent virtual nodes of the same virtual network are connected by a virtual link which is corresponding to one or more respective substrate node links, comprising:

a traffic pattern identifier to identify traffic within at least two substrate nodes with regard to the resources individually consumed by the virtual networks;

a resource reallocator to reallocate resources depending on an evaluation of the identified traffic patterns for optimizing resource consumption within the substrate nodes, wherein the identifying step and the evaluation and decision to execute the reallocation of resources is performed locally at each individual substrate node.

20. A method for operating at least one virtual network on a substrate network, or within a framework of a self-organizing model for optimizing resource consumption of the substrate network, where the virtual networks comprise a plurality of virtual nodes each being assigned to respective substrate nodes of the substrate network and two adjacent virtual nodes of the same virtual network are connected by a virtual link which is corresponding to one or more respective substrate node links, comprising the following steps:

identifying a traffic pattern within at least two substrate nodes with regard to the resources individually consumed by the virtual networks;

reallocating of the resources depending on an evaluation of the identified traffic patterns for optimizing resource consumption within the substrate nodes, wherein the identifying step and the evaluation and decision to execute the reallocation of resources is performed locally at each individual substrate node, and the decision to execute reallocation of resources and/or the evaluation of the migration or moving mechanism comprises the consideration of a history of self-organization processes of the respective substrate node and/or virtual node or network.

21. A virtual network environment on a substrate network, or within a framework of a self-organizing model for optimizing resource consumption of the substrate network, preferably for carrying out the method according to claim 20, wherein the virtual networks comprise a plurality of virtual nodes each being assigned to respective substrate nodes of the substrate network and wherein two adjacent virtual nodes of the same virtual network are connected by a virtual link which is corresponding to one or more respective substrate node links, comprising:

a traffic pattern identifier to identify traffic within at least two substrate nodes with regard to the resources individually consumed by the virtual networks;

a resource reallocator to reallocate resources depending on an evaluation of the identified traffic patterns for optimizing resource consumption within the substrate nodes, wherein the identifying step and the evaluation and decision to execute the reallocation of resources is performed locally at each individual substrate node.

22. A virtual network environment on a substrate network, or within a framework of a self-organizing model for optimizing resource consumption of the substrate network, preferably for carrying out the method according to claim 16, wherein the virtual networks comprise a plurality of virtual nodes each being assigned to respective substrate nodes of the substrate network and wherein two adjacent virtual nodes of the same virtual network are connected by a virtual link which is corresponding to one or more respective substrate node links, comprising:

a traffic pattern identifier to identify traffic within at least two substrate nodes with regard to the resources individually consumed by the virtual networks;

a resource reallocator to reallocate resources depending on an evaluation of the identified traffic patterns for optimizing resource consumption within the substrate nodes, wherein the identifying step and the evaluation and decision to execute the reallocation of resources is performed locally at each individual substrate node.

* * * * *